United States Patent [19]

Omaki et al.

[11] Patent Number: 4,561,748

[45] Date of Patent: Dec. 31, 1985

[54] FOCUS DETECTION DEVICE

[75] Inventors: Takanobu Omaki, Sennan; Akiyoshi Nakamura; Masato Ishida, both of Sakai; Shuzo Matsushita, Ikeda, all of Japan

[73] Assignee: Minolta Camera Kabushiki Kaisha, Osaka, Japan

[21] Appl. No.: 610,676

[22] Filed: May 16, 1984

[30] Foreign Application Priority Data

May 20, 1983 [JP] Japan .................................. 58-89717
May 20, 1983 [JP] Japan .................................. 58-89716

[51] Int. Cl.⁴ ............................................. G03B 3/00
[52] U.S. Cl. .................................................. 354/403
[58] Field of Search ................. 354/403, 152, 154; 356/1; 250/201 AF, 204

[56] References Cited

U.S. PATENT DOCUMENTS 3,936,187  2/1976  Momose ..................... 354/403 X
4,032,934  6/1977  Hendrickson ..................... 354/403
4,317,991  3/1982  Stauffer ..................... 354/403
4,357,085  11/1982  Niwa et al. ..................... 354/403
4,464,038  8/1984  Nanba ..................... 354/403

FOREIGN PATENT DOCUMENTS 111929  8/1980  Japan ..................... 354/403

*Primary Examiner*—William B. Perkey
*Attorney, Agent, or Firm*—Price, Gess & Ubell

[57] ABSTRACT

An active focus detecting device for use in a camera is provided and includes emitting light that is polarized, and collimated so that the light forms a light bundle which will pass near the optical axis of the objective lens, and then will be projected in a diverging light path after having been focused by the objective lens towards the object. A polarization component is provided for receiving the returning light and directing a component of that light towards a detector for determining a focusing condition.

13 Claims, 21 Drawing Figures

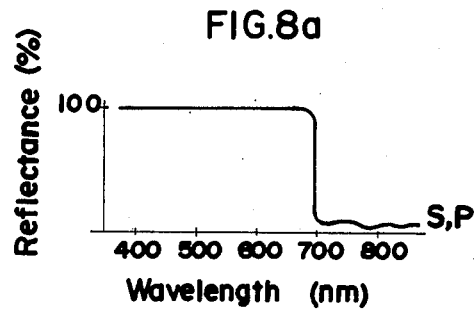
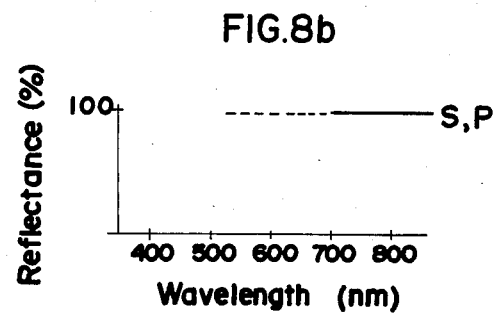
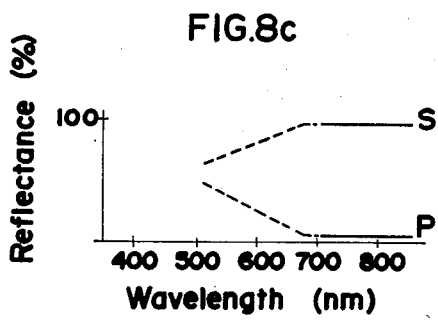
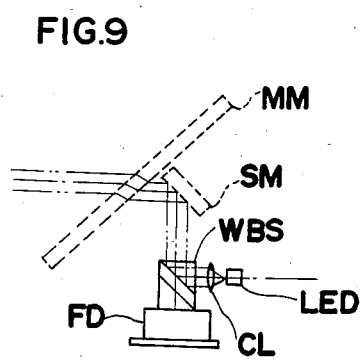
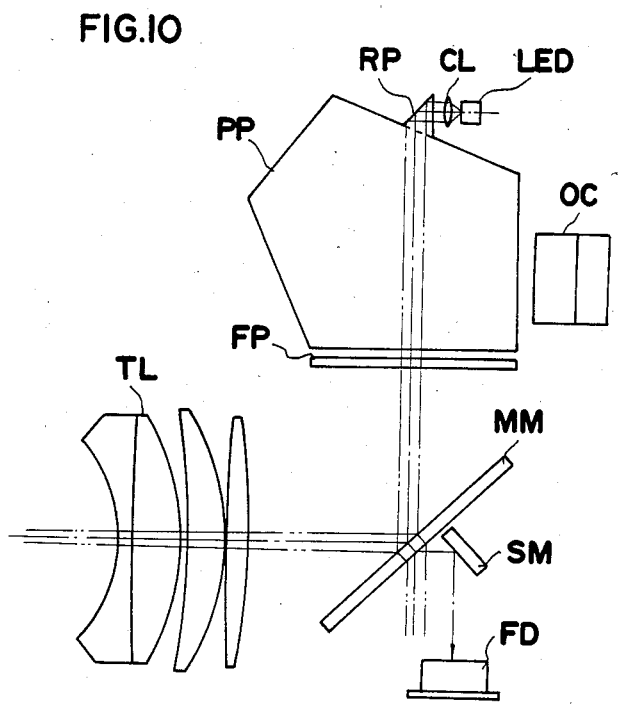

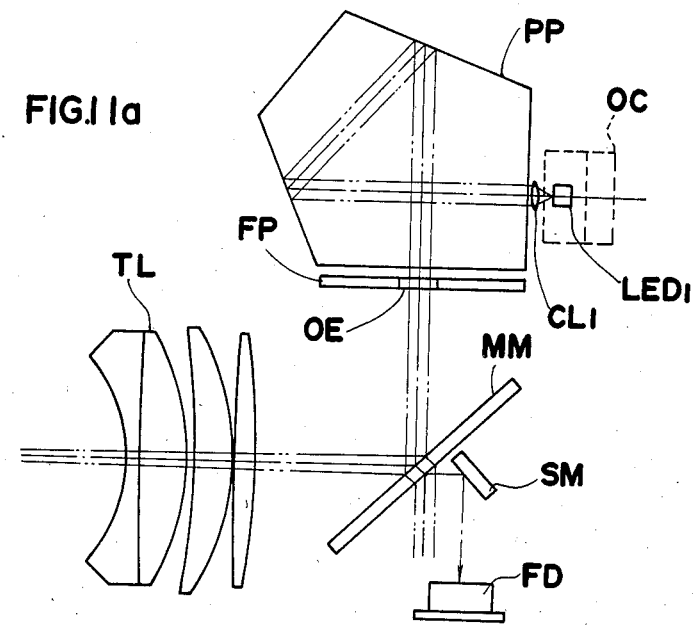
FIG.11a
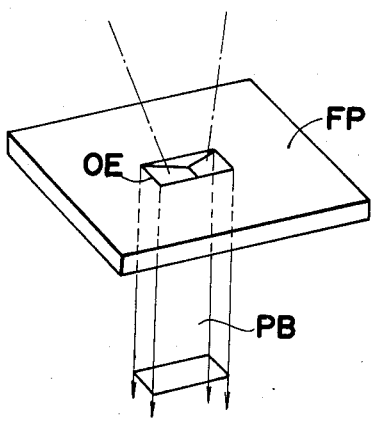
FIG.11b
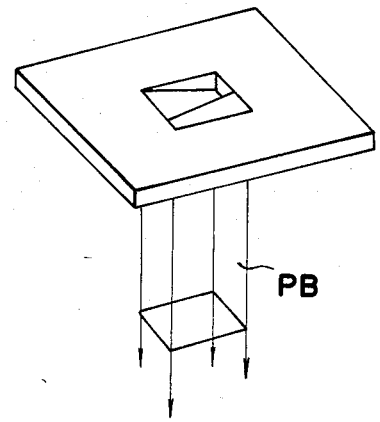
FIG.11c
FIG.12
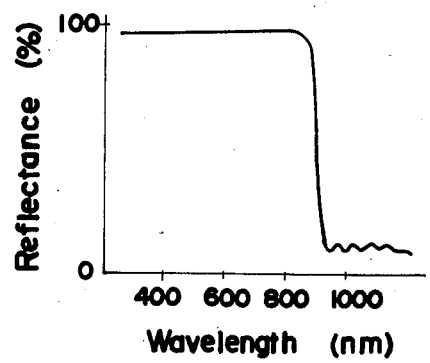

FOCUS DETECTION DEVICE

BACKGROUND OF THE INVENTION

1. Field of the Invention

The present invention relates to a focus detecting device for use in a lens interchangeable camera such as a single lens reflex camera.

2. Description of the Prior Art

Heretofore, there are various kinds of devices which detect the focusing condition of the objective lens by means of measuring the light coming from an object to be photographed (hereinafter referred to as object light) and having passed through the objective lens mounted on a camera body. However, such devices have a disadvantage that when the brightness of the object is low, the devices cannot detect the focusing condition precisely due to the lack of the intensity of light to be measured. It may be thought that the focus detecting device itself should project a light beam to illuminate the object and become free from the above disadvantages. In the case of the lens interchangeable camera to which various kinds or types of lenses are coupled selectively, a type of light projector which projects the light beam through the lens coupled with or mounted on the camera body is favorable since no parallax will occur between the objective lens and the focus detecting device. In the case when the light beam is projected from the rear of the objective lens to an object to be photographed, any light to be projected is likely to be reflexed by the surfaces of the lens elements of the objective lens and not reach the object. Further, the light once reflected at a surface of an lens element is reflected many times by a plurality of surfaces of the lens elements to cause a veiling glare that affects the light measurement. As the veiling glare is predominantly strong in comparison with the signal light reflected from an object to be photographed, the light detector for the focusing detection will show a bad accuracy of detection or sometimes can not detect the focusing condition when the detector receives the veiling glare.

SUMMARY OF THE INVENTION

An object of the present invention is to provide a device which can detect the focusing condition with high accurary even for an object with a low brightness and which is free from the veiling glare that worsens the accuracy of the focus detection or makes the focus detection impossible.

Another object of the present invention is to provide a focus detecting device which projects a light beam through a camera objective lens onto the object to be photographed and received through the objective lens the light reflected from the object and which can efficiently receive the light beam projected towards the object.

To attain the above object, the present invention is, as its first feature, arranged such that polarization of light is made use of to make ineffective the light reflected by the surfaces of its lens elements.

To attain the above object, the second feature of the present invention resides in the arrangement wherein, due to the fact that, when a light beam parallel with the optical axis of the objective lens is projected through the objective lens towards an object along with its optical axis with the center or axis of the light beam being coincide with the optical axis, the light reflected from the object returns to the objective lens along a light path that is the same as the path of the projected light. A light beam is projected from a light projecting means at the rear of the objective lens towards an object with the light beam being in parallel with the optical axis of the objective lens and the center or axis of the beam being coincide with the optical axis, and the light receiving means for receving, through the objective lens, the light reflected from the object is arranged to receive the light within the area that is substantially equal to the cross sectional area of the parallel light beam having been projected whereby the light receiving means efficiently receives the projected light.

BRIEF DESCRIPTION OF THE DRAWINGS

FIG. 8(a) is a graph showing the spectral reflectance characteristics of the main mirror of the fourth embodiment;

FIG. 8(b) is a graph showing the spectral reflectance characteristics of the submirror SM of the same;

FIG. 8(c) is a graph showing the spectral reflectance characteristics of the beam splitter BS of the same;

FIG. 9 is a cross-sectional view of a modification of the fourth embodiment;

FIG. 10 is a cross-sectional view of the fifth embodiment;

FIG. 11(a) is a cross-sectional view of the sixth embodiment;

FIG. 11(b) is a perspective view showing the focusing screen FP of the sixth embodiment;

FIG. 11(c) is a perspective view showing the modification of the focusing screen FP;

FIG. 12 is a graph showing the spectral reflectance characteristics of the reflecting plane of the pentagonal prism;

DETAILED DESCRIPTION OF THE PREFERRED EMBODIMENTS

Figure 1:
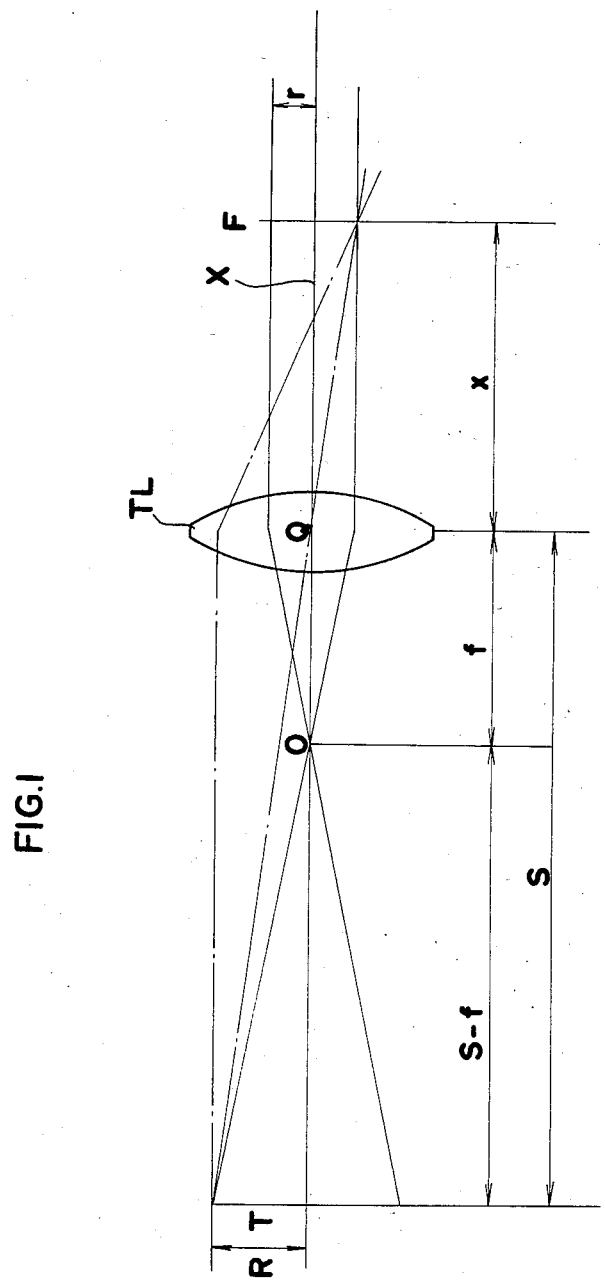
FIG. 1 is a schematic illustration for explaining the principle of the first embodiment of the present invention.

Before the explanation of the preferred embodiments with reference to the drawings, the principle of the present invention for efficiently making use of the projected light will first be explained with reference to FIG. 1. In FIG. 1, a camera objective lens TL is assumed to be at the position Q and has a focal length f. The reference character T designates an object to be photographed while F designates the film plane of a camera. It is also assumed that a parallel light beam with its center coinciding with the optical axis of the objective lens and having a radius r in the cross section is projected from the rear of the objective lens TL towards the object. If the front focal point of the objective lens TL is at O, the parallel light beam is converged at the point O and makes a spot of a radius R on the object T which is at the distance of S, the distance from the objective lens TL to the film plane F is x, the following relationship exists:

$$(1/S)+(1/x)=(1/f) \quad (1)$$

On the other hand, the magnification $\beta$ is given by $$\beta=(x/S)=(r/R) \quad (2)$$

From the equations (1) and (2), $$S=f(1+(1/\beta)) \quad (3)$$

is obtained. As seen from the Figure $\overline{OQ}=f$, so that the distance between T and O, i.e., $\overline{TO}=s-f$ is given by the following formula:

$$S-f=(f/\beta) \quad (4)$$

As the light beam entering the objective lens TL with the radius of r in the cross section of the beam diverages to have the radius of R on the object, the following formula will be obtained from the formula (4);

$$(r/f)=R/f/\beta \quad (5)$$

From the formula, the following formula is obtained:

$$R=(r/\beta) \quad (6)$$

Then, let's imagine the case where the image of the point on the object T and at the distance of R from the optical axis X is projected through the objective lens TL on the film plane reversely from the above case. The image will be formed on the film plane at the height of R' which is given by the following formula from the formula (2):

$$R'=R\cdot\beta \quad (7)$$

If the formula (6) is substituted into the formula (7), $$R'=r \quad (8)$$

will be obtained. This means that, when a parallel light bundle enters the objective lens TL along its optical axis with the radius r and the center of the beam coinciding with the optical axis and the light projected by the lens onto the object is reflected on the object, traverses the objective lens and reaches the film plane, the light will be the form of a light bundle running along the optical axis of the lens with its center coinciding with the optical axis and its radius r at the film plane being r that is the same as that of the parallel light beam projected to the objective lens. Thus, if a light receiving or detecting means is disposed to receive the light entering the area on the film plane that is substantially equal to the cross sectional area of the light beam projected to the lens, the light receiving means can efficiently receive the light projected on the object. Additionally, the formula (8) is valid irrespectively of the focal length of the objective lens so that it can be applied to any interchangeable lenses of different focal lengths.

In the various embodiments which will be described in detail hereinafter, the polarization of light is made use of to prevent the light to be projected, from being reflected on the surfaces of the lens elements and reaching the light receiving means without arriving at the object. In view of this, the expression of polarized light component in FIG. 2 will be explained. In consideration of the plane determined by an incident ray and the normal to the light reflecting surface (i.e. the incident plane) and the plane perpendicular to the incident plane, the polarized light component lying in the incident plane is generally referred to as P wave while the polarized light component lying in the plane perpendicular to the incident plane is referred to as S wave. The same references are made in this description. The P wave is expressed in the Figures by "→" and "→" wherein "→" represents the P wave which is projected from the light source towards an object, while "→" represents the P wave which has been reflected by the object and is returning. In the similar way, "•" and """ are used for the S wave wherein "•" represents S wave being projected from the light source towards the object while """ represents the S wave of the light reflected by the object, the surface of the lens elements and the like.

Figure 2:
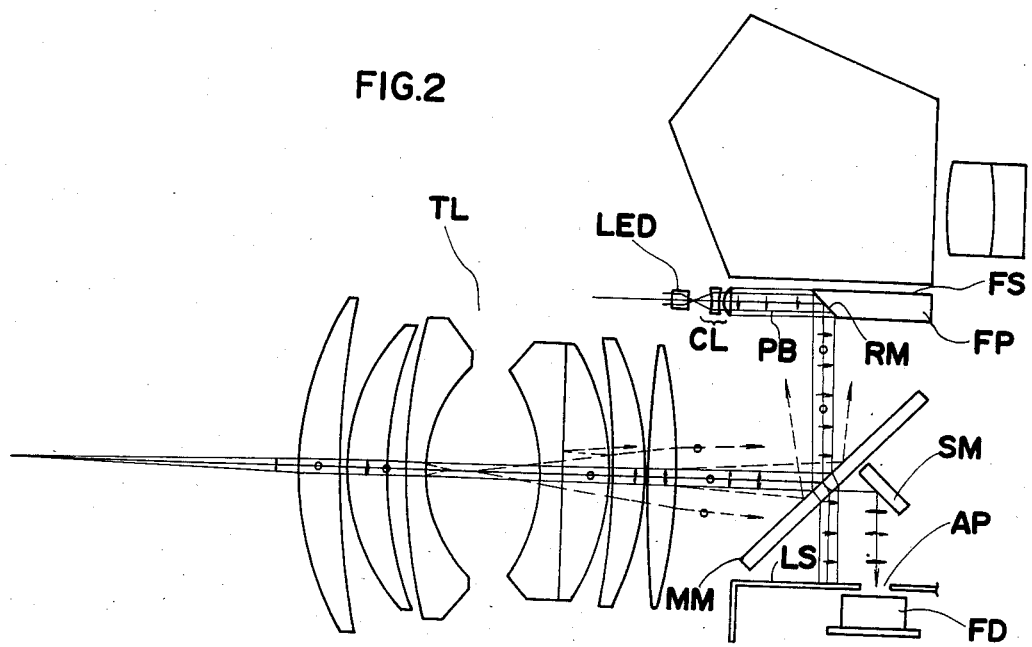
FIG. 2 shows a cross sectional view of the first embodiment of the present invention.

With reference to FIG. 2, a light source LED emits nonpolarized light rays which are refracted by a collimater lens CL to travel parallelly with each other as a parallel light beam PB. A focusing screen FP has a thickness larger than the crosssectional diameter of the parallel beam PB. The upper side surface of the focusing screen FP is a focusing plane FS for observing the condition of the image formed thereon by the objective lens. At the center of the focusing screen FP is provided a reflecting mirror RM making an angle of approximately 45° with respect to the focusing plane FS to fold the optical axis of the parallel beam PB by 90° and make it coincide with the optical axis of the photographic lens TL.

Figure 3A:
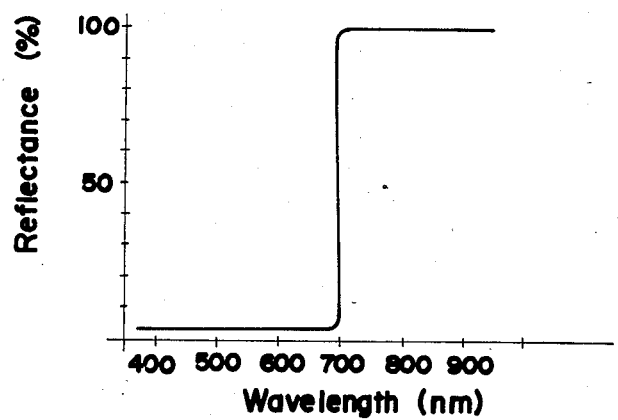
FIG. 3(a) is a graph showing the spectral reflectance characteristics of the reflecting mirror RM of the first embodiment.

As is schematically illustrated in FIG. 3(a), the reflecting mirror RM has a spectral reflectance characteristic to scarcely reflect the light of the wavelength less than 700 nm and reflect most of the light of the wavelength not less that 700 nm. Hence, of the parallel light beam PB incident on the reflecting mirror RM, only the infrared light component with the wavelength not less than 700 nm is reflected and directed to the main mirror MM. As is apparent from the observation of FIG. 3(a), the reflecting mirror RM has the characteristics to reflect only the light in the infrared light region and scarcely reflect the visible light so that the image formed on the focal plane FS with the visible light of the wave length range approximately between 400 nm and 700 nm can be observed without any difficulty.

Figure 3B:
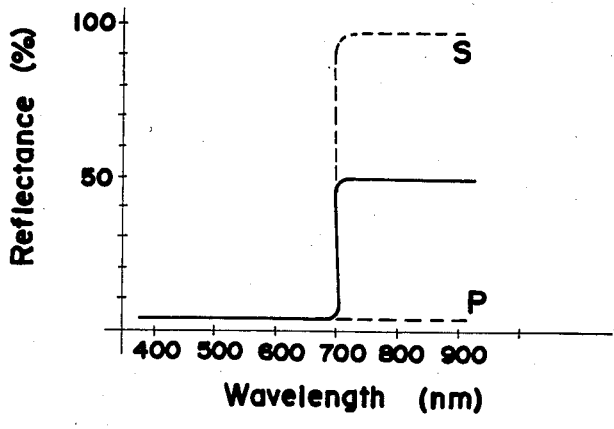
FIG. 3(b) is a graph showing the spectral reflectance characteristics of a modification of the main mirror.
Figure 4:
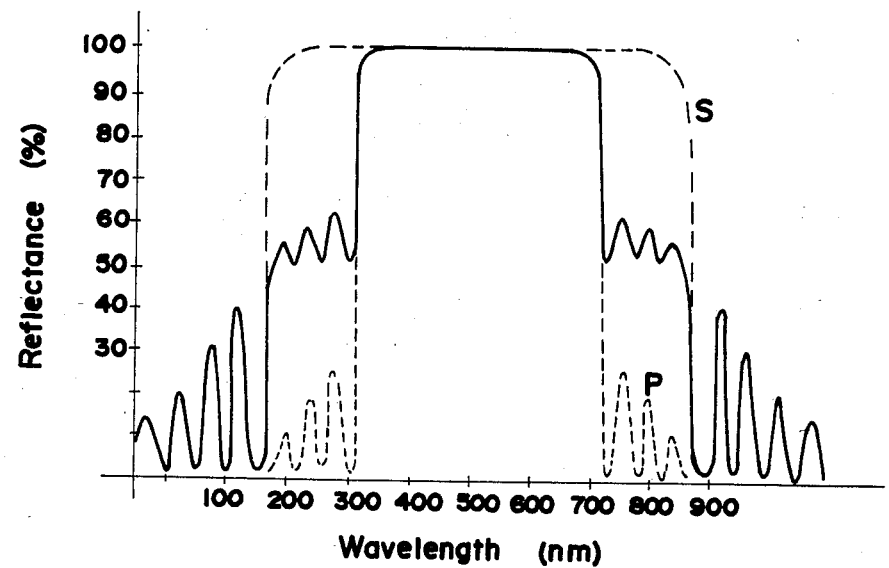
FIG. 4 is a graph showing the spectral reflectance characteristics of the main mirror.

Thus, the main mirror MM receives infrared parallel beams PB with the wave length not less than 700 nm and including the P wave and s wave components. The spectral reflectance characteristics of the main mirror MM is shown in FIG. 4 wherein P represents the spectral reflectance characteristics for the P wave component of the incident light while S represents the spectral reflectance characteristics for the S wave component of the incident light. The solid line shows the spectral reflectance with respect to the energy quantity. As is apparent from FIG. 4, the main mirror MM shows a characteristic that it scarcely reflects the P wave component of the wavelength not less than 700 nm but sufficiently reflects the S wave component of the wave length approximately between 700 nm and 900 nm, so that only the S wave component "•" of the infrared parallel light beam incident on the main mirror MM is reflected by the main mirror MM and is directed to the objective lens. Thus, the S wave component of the infrared parallel light beam is projected to the objective lens TL. On the other hand, the P wave component "→" passes through the main mirror MM and reaches a light blocking member or light shield LS to be absorbed thereby so that the P wave component will not contribute to the signal but does not disturb, as a noise, the signal to be utilized for the focus detection. As the main mirror with the spectral reflectance characteristics shown in FIG. 3(b), a mirror may be employed which has the structure indicated in MIL-Standard Handbook (Optical Design Edition) 20–49. Such a mirror will show the spectral reflectance characteristics as described above. As the reflecting mirror RM, a mirror may be employed which has the spectral reflectance characteristics to reflect only the S wave component of the infrared light as shown in FIG. 3(b). Although the light beam projected on the object is S wave light as shown by "•" in FIG. 2, it is scattered by the reflection on the object to be a light consisting of P wave "→" and S wave """ components in mixture, the mixed light passing through the objective lens TL and returning to the camera body. The P wave "→" having passed through the main mirror MM is reflected or folded by the sub mirror SM downward relative to the camera body and impinges through the aperture AP of the light shield LS onto a focus detector FD which is located at a position equivalent to the film plane. The focus detector FD has a light receiving plane having the shape equal to the cross section of the infrared parallel light beam PB that was projected into the objective lens TL. The center of the light receiving plane is coincident with the optical axis X. If the light reflecting surface of the sub mirror SM is formed to reflect only the infrared light of the wavelength about 800 nm, further severe wavelength selection will be enabled in addition to the selection making use of the polarization of the main mirror. The polarization of the light reflected within the objective lens among the surfaces and interfaces of its lens elements and of the light reflected at the mirror and at the surface of the lens remains unchanged because the lens surface is a smooth mirrorlike surface of a dielectric material. Consequently, the light is reflected to be the S wave as shown by """ which, in turn, is reflected by the main mirror MM and will never impinge on the focus detector FD through the main mirror MM.

As described above, according to the relevant embodiment, only the S wave component of the infrared parallel light beam PB is projected into the objective lens from it's rear to be projected on an object to be photographed and only the P wave component of the light reflected from the object is introduced to the focus detector FD so that the accuracy of focus detection will be ensured even if a veiling glare of the above S wave component appears, since the S wave component to be projects remains as the S wave even after being reflected by a lens surface of the objective lens or the like and is reflected by the main mirrow MM. In addition, as the infrared parallel light beam PB is project on the object to illuminate it and the light reflected by the object is measured for the focus detection, accurate focus detection is ensured even for an object with low brightness. Further, if the reflecting mirror RM which reflects only the infrared light is provided within a focusing plate FP as in the case of the present invention, focus detection for an object on the optical axis is enabled without affecting the observation of the viewfinder image and parallax will not occur between the objective lens and the focus detecting system.

Figure 5:
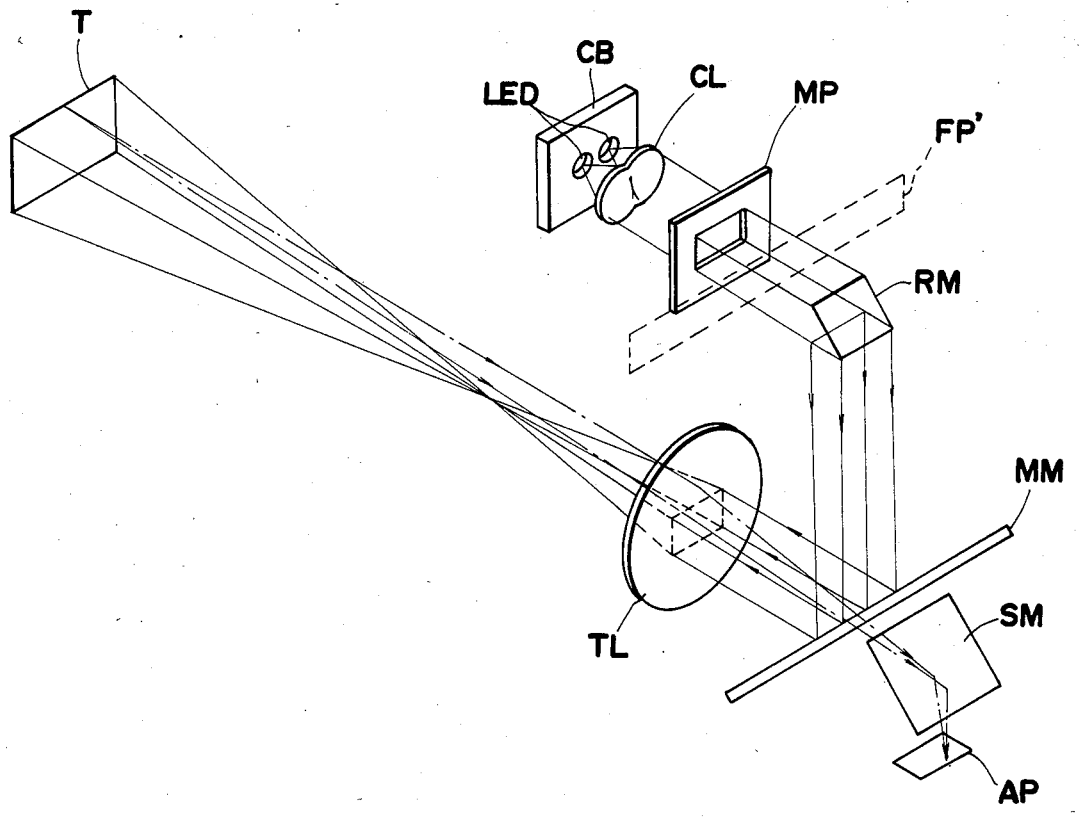
FIG. 5 is a perspective view of the second embodiment of the present invention.

FIG. 5 is a perspective view of the main part of the second embodiment of the present invention which has substantially the same construction as that of the embodiment shown in FIG. 2, but is different from the latter in that a pair of light sources LED and collimator lenses CL are arranged side by side respectively and a mask plate MP is disposed between the collimator lenses CL and a side of the focusing plate FP', such that a parallel light beam with a rectangular shape in cross section impinges on the reflecting mirror RM. The reference character T represents an object to be photographed. According to the second embodiment, the amount of the light beam to be projected from the rear of the photographic lens is increased and the range of the brightness for which the accurate focus detection is ensured is extended in the lower side.

Figure 6:
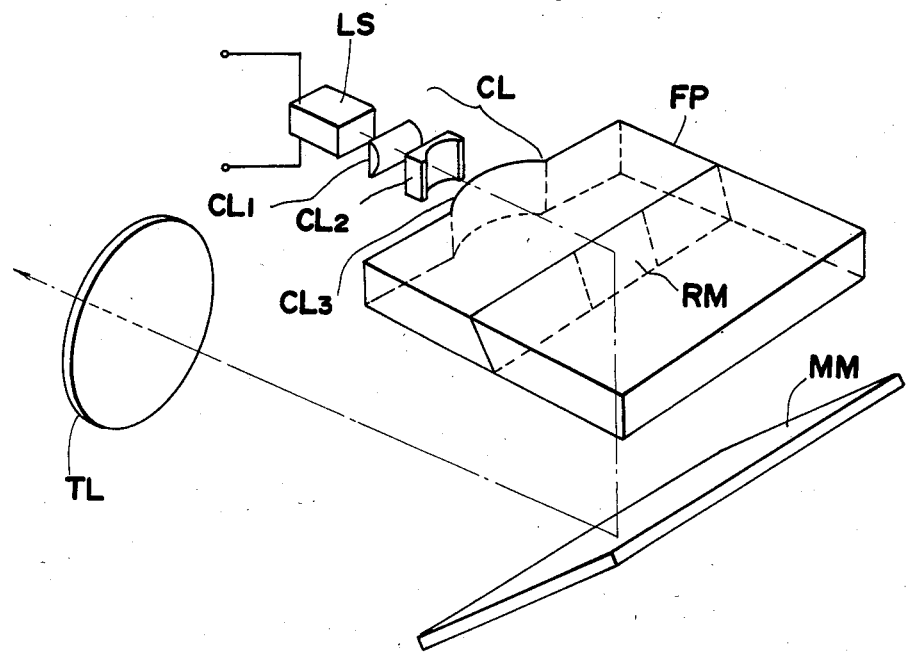
FIG. 6 is a perspective view of the main portion of the third embodiment.

FIG. 6 is a perspective view of the third embodiment modified from the second embodiment shown in FIG. 5. The third embodiment is characterized by a semiconductor laser LS for the light source LED and that, as the collimator lens CL, a convex cylindrical lens CL1 and a convex cylindrical lens CL2 are arranged in the order of description from the side of the semiconductor laser SL with the axis of the cylinder of the convex lens CL1, being parallel with the juction plane of the semiconductor laser LS with the axis of the cylinder of the concave lens CL2 being normal to the junction plane. A convex cylindrical surface CL3 is formed on the side FP' of the focusing plate FP with the axis of cylinder of the cylindrical surface CL3 being normal to the junction plane. When a given voltage is applied to the P and N terminals of the semiconductor laser LS, a light beam of a slit shape in cross section is emitted from the junction plane. The slit-shaped light beam is converted into a parallel beam with a given rectangular cross section by means of the collimater lens CL composed of the cylindrical lenses CL1 and CL2 and the cylindrical surface CL3. The parallel beam is used for the focus detection in the same manner as in the aforementioned embodiments.

Figure 7:
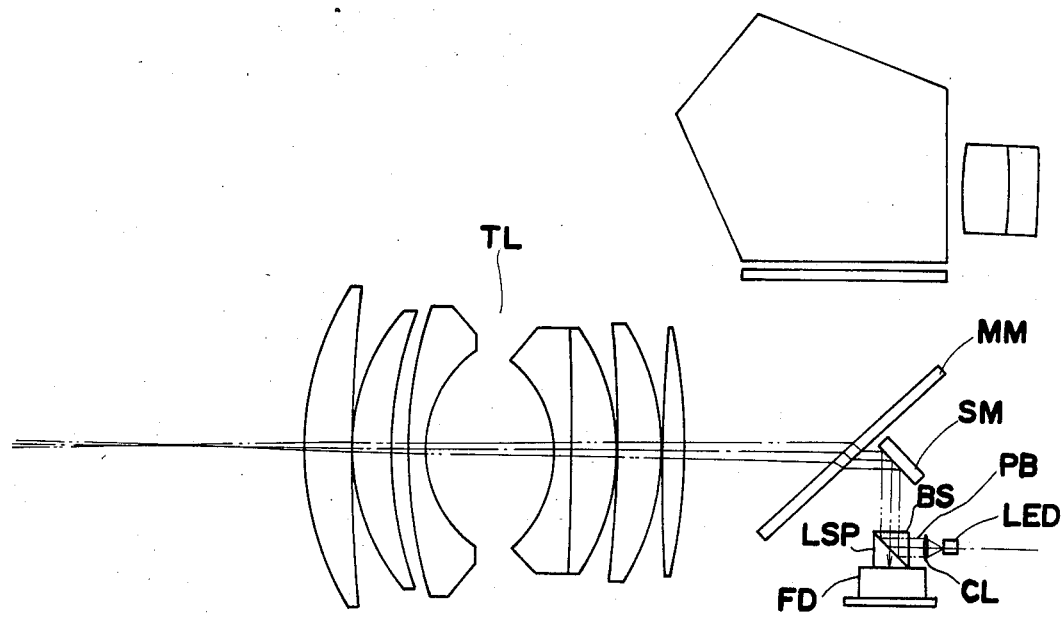
FIG. 7 is a cross-sectional view of the fourth embodiment.

FIG. 7 shows the fourth embodiment of the present invention wherein the light source LED is located in the vicinity of the focus detector FD. The light beam from the light source LED is converted by the collimator lens CL to be a parallel beam which impinges on a beam splitter BS disposed on the focus detector FD. The beam splitter BS has a reflectance characteristics as shown in FIG. 8(c) wherein only the S wave component is reflected upwards while the P wave component is absorbed by a light blocking plane LSP opposite to the plane through which the parallel beam PB incident. The sub mirror SM shows a high reflectance for the light of a wavelength not less than 700 nm as shown in FIG. 8(b) and serves to reflect the S wave component of the parallel beam PB reflected by the beam splitter, the S wave component being projected into the objective lens TL through the main mirror MM. The main mirror has spectral reflectance characteristics which is called as a cold mirror as shown in FIG. 8(a). The parallel light beam PB composed of the S wave component is reflected and scattered by the object to include both P wave and S wave components and returns to the camera. The light beam coming back from the object passes again through the main mirror MM and is reflected by the submirror SM to reach the beam splitter BS. The beam splitter BS reflects the S wave component towards the light source LED and allows that P wave component, which is used for making a signal, to pass therethrough and enter the focusing detector FD.

FIG. 9 shows an example wherein the beam splitter BS of FIG. 7 is composed of a double beam splitter WBS to improve the S/N ratio of the P wave.

FIG. 10 shows the fifth embodiment of the present invention wherein a reflecting prism RP is cemented on the pentagonal prism PP. Of the reflecting planes of the reflecting prism RP, at least the plane being in cemented contact with the pentagonal prism PP is formed with a layer which reflects visible light but allows the passage therethrough of the infrared light of the wavelength not less than 700 nm. With the layer, the viewfinder image can be observed without being damaged and the infrared light beam can pass therethrough to be projected. In the vicinity of the reflecting prism RP are provided a light source LED and a collimator lens CL. The main mirror has a spectral reflectance characteristics similar to that of the first embodiment, the characteristics being shown definitely in FIG. 4. The sub-mirror SM also has the characteristics as shown in FIG. 3(a).

With the construction as described above, the light emitted from the light source LED is converged by the collimator lens CL to be a parallel light beam which in turn is reflected by the reflecting plane of the reflecting prism RP and the infrared beam of the wavelength not less than 700 nm will enter the pentagonal prism PP by way of the interface between the prisms. The infrared parallel light beam passes through the pentagonal prism PP and the focusing screen FP and impinges on the main mirror MM which reflects only the S wave component of the beam towards the objective lens TL. The P wave component passes through the main mirror MM and is absorbed by the light shield member LS shown in FIG. 2. The S wave component of the infrared light beam is project onto the object to be photographed and is reflected and scattered thereby to be a light including the S and P wave components in mixture which light passes through the objective lens TL again and reaches the main mirror MM. The S wave component of the light incident on the main mirror MM is reflected thereby together with the S wave component that was reflected by the objective lens TL before arriving at the object, and will not reach the focus detector FD. On the other hand, the P wave component passes through the main mirror MM and is reflected by the sub-mirror SM to be received by the focus detector FD and used for the focus detection. In this embodiment, even if the S wave component of the infrared light beam projected to the objective lens is reflected by the lens surfaces of the objective lens to be a veiling glare, the veiling glare light consisting of the S wave component also is reflected by the main mirror MM and will not impinge on the focus detector FD and will not affect the focus detection.

FIG. 11(a), (b) and (c) show the sixth embodiment of the present invention wherein FIG. 11(a) is its general view, FIG. 11(b) is a perspective view of its focusing screen and FIG. 11(c) shows the modification of the focusing screen. In this embodiment, two light sources LED1 and LED2 (LED2 is not shown in the Figure) and two collimator lenses CL1 and CL2 (CL2 is not shown in the Figure) are disposed on both sides of the eyepiece lens OC. The light emitted from the light sources LED1 and LED2 are respectively converged by the collimator lenses CL1 and CL2 to be two parallel light beams which are reflected in a pentagonal prism PP independently of each other and reach the focusing screen FP. On the reflecting plane of the pentagonal prism PP is formed a light reflecting layer which reflects not only the visible light but the infrared light of the wavelength less than 900 nm as shown in FIG. 12. At the center of the focusing screen FP is formed a pair of optical wedges OE which are arranged symmetrically with each other with respect to the right to left direction of the view-frame of the view-finder. The optical wedges refracts the two parallel beams so as to form a single parallel light beam with its center or optical axis coincident with the optical axis of the objective lens. In place of the optical wedges, another pair of wedges may be employed which are arranged, as shown in FIG. 11(c), in the direction of up-down or vertical direction of the view-frame of the view-finder likely as a image split prism. The optical wedges as shown in FIG. 11(c) serves as an image split prism for a visible light and may be used for the indication of the focus detected area in the view finder field if the optical wedges are made transparent. The spectral reflectance characteristics of the main mirror MM and the submirror SM may be as shown in FIG. 4 and FIG. 8(b).

Figure 13:
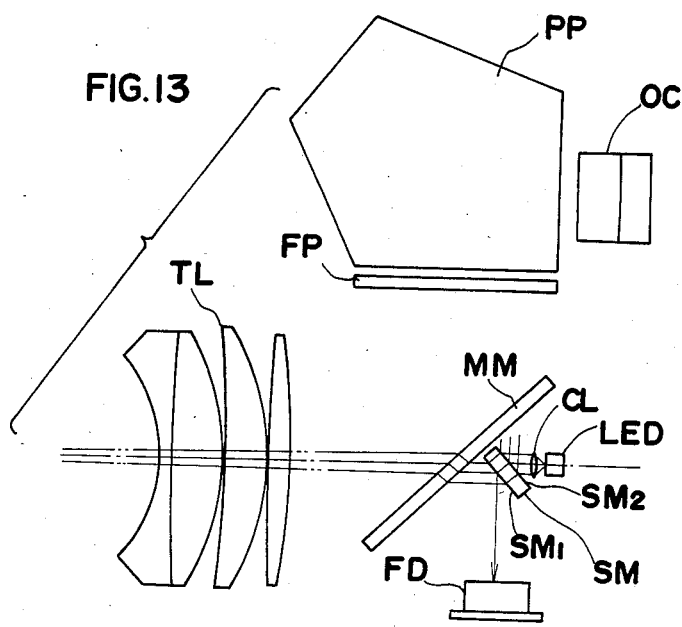
FIGS. 13 and 14 are cross-sectional views of the seventh and eighth embodiments respectively.

FIG. 13 shows the seventh embodiment wherein the light source LED and the collimator lens CL are located behind the sub-mirror SM which is formed on its front and back surfaces with light reflecting layers both having the spectral reflectance characteristics as shown in FIG. 4. Accordingly, of the light beam emitted from the light source LED and made a parallel light beam PB, only the S wave component is reflected at the back surface SM2 of the submirror to go upwards while the P wave component passes through both the back and front surfaces SM2 and SM1 and is projected forward. The P wave component, then, passes through the main mirror having the characteristics as shown in FIG. 8 and is projected onto an object to be photographed. The light is then reflected by the object scattered thereby to include S and P wave components in mixture. The light passes through the main mirror MM and sub-mirror SM. At that time, the P wave component passes through the sub-mirror SM and only the S wave component reaches the focus detector FD. In this embodiment, the polarized light components are treated opposite way from in the the other embodiments. That is, the S wave component is used for the focus detection while the P wave component to be a veiling glare will not be introduced to the focus detector.

Figure 14:
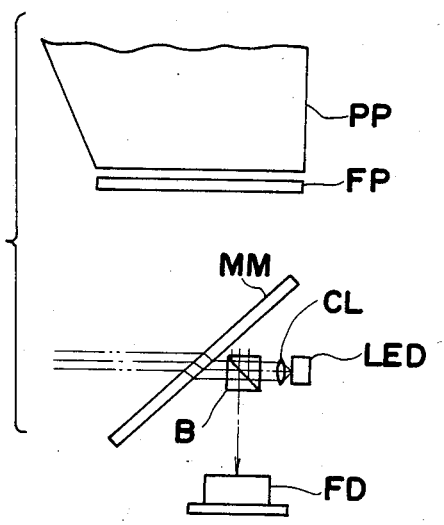

FIG. 14 shows the eighth embodiment of the present invention which is based on substantially the same technical concept of the seventh embodiment but is characterized in that the light reflecting layers formed on the front and back surfaces SM1 and SM2 of the submirror SM in the seventh embodiment are formed together at the beam splitting plane of a beam splitter B. That is, the layer at the light splitting plane of the beam splitter B is constructed to have a layer structure that is symmetric in the direction of the thickness of the layer such that a single beam splitter B shows the single spectral reflectance characteristic as shown in FIG. 4 for the light incident thereon from either sides. With reference to FIG. 14, the light emitted from the light source LED is refracted by the collimator lens CL to be a parallel light beam which impinges on the beam splitting plane of the beam splitter B at the angle of 45°. As the beam splitting layer has the spectral reflectance characteristics as shown in FIG. 4, the S wave component is reflected upwards while the P wave component is allowed to pass therethrough. The P wave component having traversed the beam splitter then passes through the main mirror and the objective lens and is directed to the object which in turn reflects and scatters the light. The reflected and scattered light including P and S wave components again passes through the objective lens TL and the main mirror MM and reaches the beam splitter B. As the beam splitter B shows the spectral reflectance characteristics as shown in FIG. 4 also for the light incident from the side of the objective lens TL, the S wave component of the light from the object is reflected and directed to the focus detector FD while the P wave component passes through the beam splitter and travels towards the light source LED but will not be incident on the focus detector FD. The beam splitter may not necessary have the form of the prism but may be composed of plane glass plates sandwitching the beam splitting layer therebetween.

Figure 15:
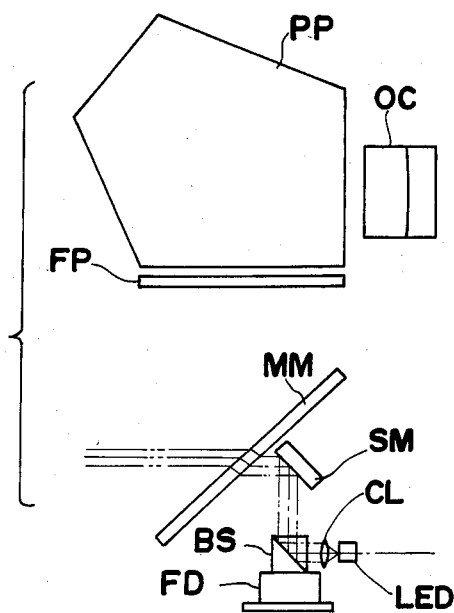
FIGS. 15 and 16 are cross-sectional views of the ninth embodiment and its main portion respectively.
Figure 16:
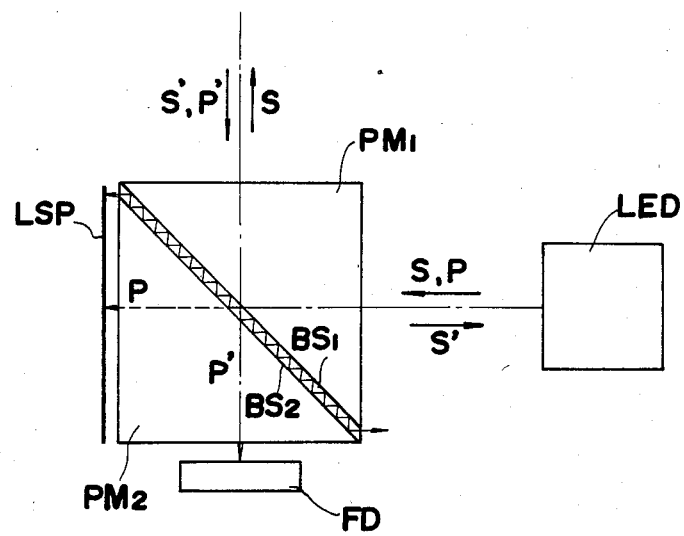

FIGS. 15 and 16 show the ninth embodiment of the present invention which is a modification of the embodiment shown in FIG. 7. As is apparent from FIG. 16 which is an enlarged view of the beam splitter BS shown in FIG. 15, the beam splitter BS has double splitting plane BS1 and BS2 which are sandwitched within a prism. This structure is formed by the light polarizing beam splitter layers which are formed by vaporization on both side of a plane parallel glass plate of the thickness of, for example 0.1 mm and the glass plate is sandwitched between two right triangular prisms PM1 and PM2. Both of the polarizing beam splitting planes BS1 and BS2 have a symmetric layer construction with each other in the direction of the thickness of the layer and show the same light transmissive and reflective characteristics for the lights incident on the front and rear surfaces thereof.

In operation, the light emitted from the light source LED includes P and S wave components and is concentrated by the collimator lens CL to be a parallel light beam which enter one PM1 of the prisms. The first polarizing beam split plane BS1 reflects the S wave component and allows the P wave component to pass therethrough as in the other embodiments. The P wave component having passed through the first polarizing beam splitting plane BS1 further passes through the second polarizing beam splitting plane BS2 and reaches the light blocking plane LSP to be diminished and extinguished. The S wave component which may have incidentally passed through the first polarizing beam split plane BS1 (although it is normally to be relfected by the plane) is reflected repeatedly between the first and second polarizing beam split planes BS1 and BS2 and is finally emitted out of plane parallel plate. This is because the polarizing beam splitter planes BS1 and BS2 have with symmetric layer constructions with which even if any S wave component passes through the first polarizing beam splitting plane BS1, it is reflected at the surface of the second polarizing beam splitter BS2 and then by back surface of the first polarizing beam splitter plane BS1 with the reflections being repeated until the S wave component is finally brought out of the plate.

The light beam composed of the S wave component and having arrived at the object is reflected and scattered by the object to come back as a light beam including P wave component as well. The light beam returning from the object enters the prism from its top surface as the S' and P' wave component. The S' component is reflected by the first polarizing beam splitting plane BS1 to go towards the light source LED. The P' component passes through the first and second polarizing beam splitting planes BS1 and BS2 to reach the focus detector FD and serves for the focus detection. If a portion of the S' component passes through the first polarizing beam splitting plane BS1, it is repeatedly reflected by the front surface of the second polarizing beam splitting plane BS2 and the back surface of the first polarizing beam splitting plane and finally emanates from the side plane of the plane parallel plate. Accordingly, the focus detector FD is little affected by the S and S' components and effectively receives, as the signal, only the P' component with little noise.

As described above, the light beam to be projected onto an object has been linearly polarized to be only the S wave component or P wave component in the present invention. In the case, the object normally scatters the light to convert the S or P wave component to a light beam including both the S and P wave component upon returning to the camera body. On the other hand, if the surface of the object is a dielectric such as a mirror like surface, the polarized S or P wave light incident thereon makes regular reflection with the polarized component remaining unconverted and return to the camera body wherein the polarized component of the reflected light is the same as that of the veiling glare and is reflected by the reflecting plane so that the focus detector receives no light signal and can not make the focus detection.

To cope with such a problem, a plane parallel plate of $\lambda/4$ in thickness (hereinafter referred to as a $4/\lambda$ filter) may be disposed in front of the objective lens TL. In the case of the embodiment shown in FIG. 2, by example, the parallel beam reflected by the main mirror and passing through the objective lens TL has been linearly polarized to be the S wave which can be converted to be a circularly polarized light while traversing the $\lambda/4$ filter and the circular polarization remains after being reflected by a reflecting surface having a mirror like property. Then, when the light with the circular polarization traverses the $\lambda/4$ filter, the light is linearly polarized to be the P wave component and passes through the objective lens TL. The P wave component then passes through the main mirror MM, is polarized by the submirror SM, and then arrives at the focus detector FD. In the case of the embodiment shown in FIGS. 13 and 14, the polarized components are opposite of the above case, but a desired polarization may be given by the $\lambda/4$ filter for the returning light reflected by the object of the dielectric. For a normal object which reflects and scatters incident light, the $\lambda/4$ filter works in the opposite way that the light passing through the filter will be a natural light which is not affected by the filter while passing therethrough the second time and which passes through the objective lens TL and is reflected or transmitted by the main mirror to have a desired polarization and reach the focus detector FD.

In the above description of the present invention, the detail of the focus detector FD was not explained but a focus detector of any focus detecting principle will do for the invention which is independent of such a principle of the range finding.

As the light source, the above embodiments employed a light emitting diode (LED) and a semiconductor laser or the like which are favorable from the view point of efficiency because the time related property from application of a power source to light emission are high in comparison with the volume of the light emitting member. However, a light source such as a tungsten lamp may be employed if the time delay of the light emission and range finding is not severely restricted.

According to the present invention as described above, an accurate focus detection can be made even for an object with a low brightness. Additionally, the present invention is free from the parallax between the objective lens and the focus detecting optical system enabling the precise focus detection because the light beam for the focus detection is projected through the objective lens towards an object to be photographed. Additionally, even if the light emitted from the projecting means is reflected by the surfaces of the lens elements in the objective lens without arriving at the object, the reflected light will become a first linearly polarized component and prevented from impinging on the light receiving means by means of a selection means that allows only the second linearly polarized component to pass therethrough whereby the first linearly polarized component will not affect the focus detection as an injurious light and enables exact focus detection.

Still further, if the invention is arranged such that an infrared light is projected from a light projecting means towards an object to be photographed and the light receiving means of the focus detector receives only the infrared light, the projected light can be discriminated from other light from the object and the focusing is detected precisely with only the projected light.

Yet further, if the polarizing mirror is employed for the main mirror and the submirror of an single lens reflex camera to form a part of the light projecting means and the selection means, the construction will be significantly simplified, requiring no special room for that.

Yet more further, according to the present invention, the light projected onto an object and reflected thereby is efficiently received for the focus detection irrespective of the focal length and the other optical parameters of the objective lens so that focus detection of high accuracy can be made for even a low brightness object whereby the invention is suitable for use in a lens exchangeable camera as a single lens reflex camera.

What is claimed is:

1. A focus detecting device for use in a camera having an objective lens, comprising:
    means for emitting light which includes first and second linear polarization components arranged perpendicular to each other;
    means for selecting said first linear polarization component to project it towards an object to be photographed through said objective lens;
    means for receiving light which has been reflected from said object and passed through said objective lens, said receiving means receiving the light which includes only a second linear polarization component perpendicular to said first linear polarization component; and
    means for detecting a focusing condition of said objective lens in accordance with the light received on said receiving means.

2. A focus detecting device as claimed in claim 1, wherein said emitting means projects light in the infrared wavelength range and wherein said receiving means receives light in said infrared wavelength range.

3. A focus detecting device as claimed in claim 1, wherein said selecting means includes a polarization mirror which reflects either one of said first and second linear polarization component and which permits another to pass therethrough.

4. A focus detecting device as claimed in claim 3, wherein said polarization mirror is a main mirror of a single lens reflex camera, said main mirror having a characteristic which reflects said first linear polarization component and which permits said second linear polarization component to pass therethrough.

5. A focus detecting device as claimed in claim 1, further comprising means for collimating light emitted from said emitting means in order to form a parallel light bundle whose main light ray coincides with an optical axis of said objective lens.

6. A focus detecting device as claimed in claim 1, wherein said receiving means includes means for selecting said second linear polarization component, and means for detecting light which is selected by said second linear polarization component selecting means.

7. A focus detecting device as claimed in claim 6, wherein said second linear polarization component selecting means includes a polarization mirror which reflects either one of said first and second linear polarization component and which permits another to pass therethrough.

8. A focus detecting device as claimed in claim 7, wherein said polarization mirror is a main mirror of a single lens reflex camera, said main mirror having a characteristic which reflects said first linear polarization component and which permits said second linear polarization component to pass therethrough.

9. A focus detecting device for use in a camera having an objective lens, comprising:
    means for emitting light which includes first and second linear polarization components perpendicular to each other;
    means for reflecting said first linear polarization component towards an object to be photographed through said objective lens, said reflecting means permitting said second linear polarization component to pass therethrough;
    means for receiving light which has been reflected on the object and passed through said reflecting means; and
    means for detecting focusing condition of said objective lens in accordance with receiving condition of said receiving means.

10. A focus detecting device as claimed in claim 9, wherein said reflecting means is a main mirror of a single lens reflex camera.

11. A focus detecting device as claimed in claim 10, further comprising a sub-mirror located behind the main mirror for reflecting said second linear-polarization component towards said receiving means.

12. A focus detecting device for use in a camera having an objective lens, comprising:
    means for emitting light;
    means for collimating said light to form a light bundle which passes near the optical axis of said objective lens in order to provide the light bundle toward said objective lens, said light bundle being projected toward an object to be photographed as diverging light after having been focused by said objective lens;

means for receiving light which has been reflected on said object and passed through said objective lens; and means for detecting a focusing condition of said objective lens in accordance with the receiving condition of said receiving means.

13. The invention of claim 12 wherein the means for emitting light includes a polarization component to polarize the emitted light and the means for receiving light includes another polarization component to permit only a specific orientation of polarized light to be received by its detecting means.

* * * * *